US008619101B2

(12) United States Patent
Marcu et al.

(10) Patent No.: US 8,619,101 B2
(45) Date of Patent: Dec. 31, 2013

(54) METHODS AND SYSTEMS FOR WHITE POINT ADJUSTMENT

(75) Inventors: Gabriel G. Marcu, San Jose, CA (US); Steve Swen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 900 days.

(21) Appl. No.: 11/810,191

(22) Filed: Jun. 4, 2007

(65) Prior Publication Data

US 2008/0297456 A1 Dec. 4, 2008

(51) Int. Cl.

| | |
|---|---|
| ***G09G 5/10*** | (2006.01) |
| ***G09G 3/36*** | (2006.01) |
| ***G09G 5/02*** | (2006.01) |
| ***G06K 9/00*** | (2006.01) |

(52) U.S. Cl.
USPC ............. 345/690; 345/88; 345/589; 382/162; 382/167

(58) Field of Classification Search
None
See application file for complete search history.

(56) References Cited

U.S. PATENT DOCUMENTS

| | | | | |
|---|---|---|---|---|
| H1506 | H * | 12/1995 | Beretta | 345/591 |
| 5,483,259 | A * | 1/1996 | Sachs | 345/600 |
| 5,570,108 | A * | 10/1996 | McLaughlin et al. | 715/823 |
| 6,377,702 | B1 * | 4/2002 | Cooper | 382/167 |
| 6,686,953 | B1 * | 2/2004 | Holmes | 348/179 |
| 6,809,714 | B1 * | 10/2004 | Yamauchi et al. | 345/88 |
| 6,862,012 | B1 * | 3/2005 | Funakoshi et al. | 345/88 |
| 2002/0158885 | A1 * | 10/2002 | Brokenshire et al. | 345/611 |
| 2003/0193565 | A1 * | 10/2003 | Wen | 348/184 |
| 2004/0165094 | A1 * | 8/2004 | Fukui | 348/333.12 |
| 2005/0008258 | A1 * | 1/2005 | Suzuki et al. | 382/298 |
| 2006/0221093 | A1 * | 10/2006 | Holub | 345/589 |
| 2007/0065006 | A1 * | 3/2007 | Wilensky | 382/167 |
| 2007/0081102 | A1 * | 4/2007 | Ramanath et al. | 348/602 |
| 2008/0030518 | A1 * | 2/2008 | Higgins et al. | 345/589 |
| 2008/0266316 | A1 * | 10/2008 | Takahashi | 345/590 |
| 2009/0051711 | A1 * | 2/2009 | Evanicky et al. | 345/690 |
| 2009/0128867 | A1 * | 5/2009 | Edge | 358/504 |

OTHER PUBLICATIONS

William B. Cowan, "An Inexpensive Scheme for Calibration of a Colour Monitor in Terms of CIE Standard Coordinates", Jul. 1963, Computer Graphics, vol. 17, No. 3, pp. 315-321.*

International Color Consortium, Specification ICC.1:2004-10, www.color.org, Oct. 2004, 112 pages.

Technical Note TN2035: ColorSync on Mac OS X, http://developer.aple.com/technotes/tn/tn2035.html, Mar. 19, 2007, 47 pages.

Wikipedia, Color Temperature, http://en.wikipedia.org/wiki/Color_Temperature, May 15, 2007, 7 pages.

Wikipedia, CIE 1931 color space, http//en.wikipedia.org/w/index.php?title=CIE_1931 color_space&oldid=115984057, Mar. 18, 2007, 9 pages.

* cited by examiner

*Primary Examiner* — Bipin Shalwala
*Assistant Examiner* — Keith Crawley
(74) *Attorney, Agent, or Firm* — Blakely, Sokoloff, Taylor & Zafman LLP

(57) ABSTRACT

Methods and data processing systems are disclosed for adjusting a white point of a display. In one embodiment, a method includes setting the display to a first state. The method further includes providing a two dimensional array of white points to the display. The method further includes selecting a target white point from the two dimensional array of white points to visually match a desired white color of a medium. The method further includes encoding the selected target white point as two simultaneously captured variables. The method further includes deriving a second state of the display that corresponds to the target white point.

46 Claims, 8 Drawing Sheets
(2 of 8 Drawing Sheet(s) Filed in Color)

METHODS AND SYSTEMS FOR WHITE POINT ADJUSTMENT

FIELD OF THE DISCLOSURE

Embodiments of the present disclosure generally relate to adjusting a white point of a display device.

BACKGROUND OF THE DISCLOSURE

Electronic devices, such as computer systems or wireless cellular telephones or other data processing systems, may often include a display or display device for providing a user interface with various images, programs, menus, documents, and other types of information.

The display may illuminate or display various colors with a color space such as the CIE XYZ color space created by the International Commission on Illumination in 1931. A specific method for associating three numbers (or tristimulus values) with each color is called a color space. The human eye has receptors for short, middle, and long wavelengths, also know as blue, green, and red receptors. The CIE XYZ color space includes a set of tristimulus values called X, Y, and Z which are also roughly red, green, and blue, respectively.

The concept of color includes brightness and chromacity. For example, the color white is a bright color while the color grey is considered to be a less bright version of that same white color. In other words, the chromaticity of white and grey are the same while their brightness differs.

The CIE XYZ color space was deliberately designed so that the Y parameter was a measure of the brightness or luminance of a color. The chromaticity of a color was then specified by the two derived parameters x and y, which are functions of all three tristimulus values X, Y, and Z. FIG. 1*a* illustrates a CIE (1931) xy chromaticity diagram with all of the chromaticities visible to the average person. These are shown in color and this region is called the gamut of human vision. The gamut of all visible chromaticities on the CIE plot is the tongue-shaped or horseshoe-shaped object shown in color. The curved edge of the gamut is called the spectral locus and corresponds to monochromatic light.

Color temperature is a characteristic of visible light that has important applications in photography, videography, publishing and other fields. The color temperature of a light source is determined by comparing its hue with a theoretical, heated black-body radiator. Hue is that aspect of a color described with names such as “red”, “yellow”, etc. The Kelvin temperature at which the heated black-body radiator matches the hue of the light source is that source’s color temperature. An incandescent light is very close to being a black-body radiator. However, many other light sources, such as fluorescent lamps, do not emit radiation in the form of a black-body curve, and are assigned what is known as a correlated color temperature (CCT), which is the color temperature of a black body which most closely matches the lamp’s perceived color. Some common examples of color temperatures include a 1850 K Candle, a 2800 K Tungsten lamp (incandescent lightbulb), a 4100 K Moonlight, a 5000 K Daylight, a 5500 K Average daylight or an electronic flash (can vary between manufacturers), a 5770 K Effective sun temperature, 6500 K Daylight, and a 9300 K TV screen (analog).

FIG. 1*a* also illustrates a black body locus, with color temperatures indicated. Wavelengths of monochromatic light are shown in blue. The lines crossing the black body locus are lines of constant correlated color temperature.

The display of an electronic device may need to be calibrated in order to better match colors between the display and other types of media including other displays, paper sources, etc. FIG. 1*b* illustrates a prior approach for matching a target white point of a display to another media. The prior approach includes a one dimensional correlated color temperature slider that corresponds to the black body locus illustrated in FIG. 1*a*.

However, the prior approach allows merely a one dimensional adjustment for a target white point. There is no way to select a target white points that is not found on the black body locus which may be referred to as the slider white point locus.

SUMMARY OF THE DISCLOSURE

At least certain embodiments of the disclosures relate to methods and data processing systems for adjusting a white point of a display. In one embodiment, a method includes setting the display to a first state. The method further includes providing a two dimensional array of white points to the display. The method further includes selecting a target white point from the two dimensional array of white points to visually match a desired white color of a medium. The method further includes encoding the selected target white point as two simultaneously captured variables. The method further includes deriving a second state of the display that corresponds to the target white point.

In at least certain embodiments, a data processing system includes a processor coupled to a bus, a display coupled to the bus, and a memory coupled to the bus. The memory may be configured to store one or more programs and configured to store data for a two dimensional array of white points for presentation to the display. The processor is configured to receive a selection of a target white point from the two dimensional array of white points to visually match a desired white color of a medium.

The processor may be further configured to encode the selected target white point as two simultaneously captured variables. The processor may be further configured to derive a second state of the display that corresponds to the target white point.

Other systems and methods are also described, and machine readable media, which contain executable instructions to cause a machine to operate as described herein, are also described.

BRIEF DESCRIPTION OF THE DRAWINGS

The patent or application file contains at least one drawing executed in color. Copies of this patent or patent application publication with color drawings will be provided by the Office upon request and payment of the necessary fee.

The present disclosure is illustrated by way of example and not limitation in the figures of the accompanying drawings in which like references indicate similar elements.

DETAILED DESCRIPTION

Figure 1A:
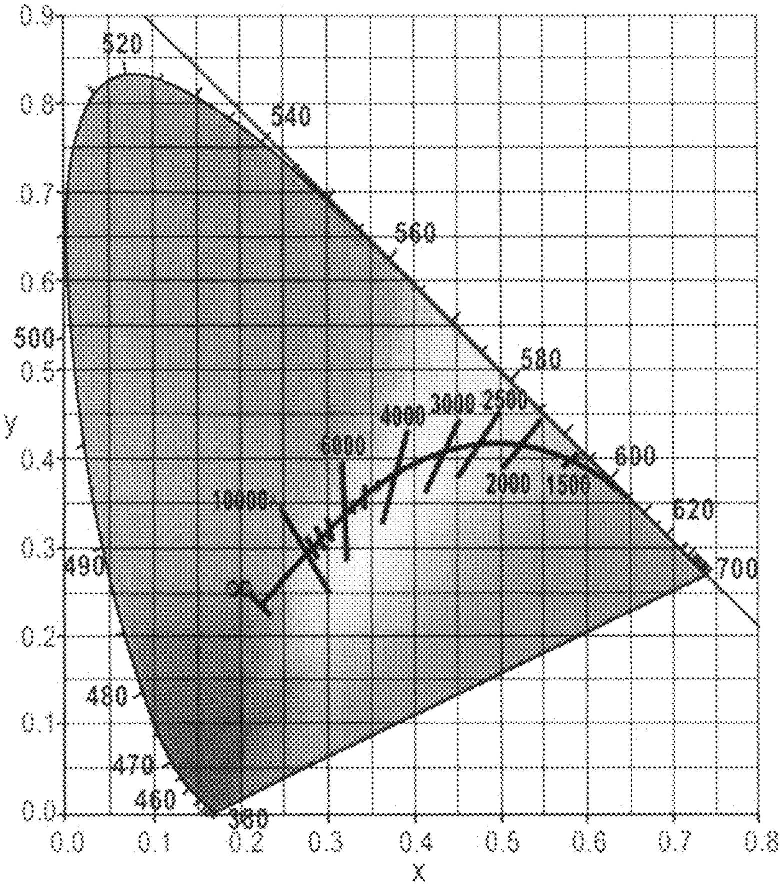
FIG. 1A (PRIOR ART)
FIG. 1A shows a CIE xy chromaticity diagram with a black body locus.
Figure 1B:
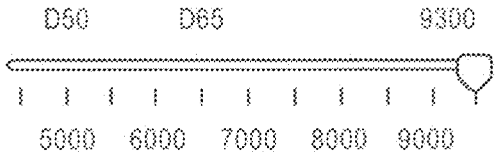
FIG. 1B (PRIOR ART)
FIG. 1B shows a prior approach for adjusting a target white point with a one dimensional slider.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosures.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, can refer to the action and processes of a data processing system, or similar electronic device, that manipulates and transforms data represented as physical (electronic) quantities within the system’s registers and memories into other data similarly represented as physical quantities within the system’s memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may include instructions for performing the operations described herein and may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory (“ROM”); random access memory (“RAM”); magnetic disk storage media; optical storage media; flash memory devices; electrical, optical, acoustical or other form of propagated signals (e.g., carrier waves, infrared signals, digital signals, etc.); etc.

Figure 2:
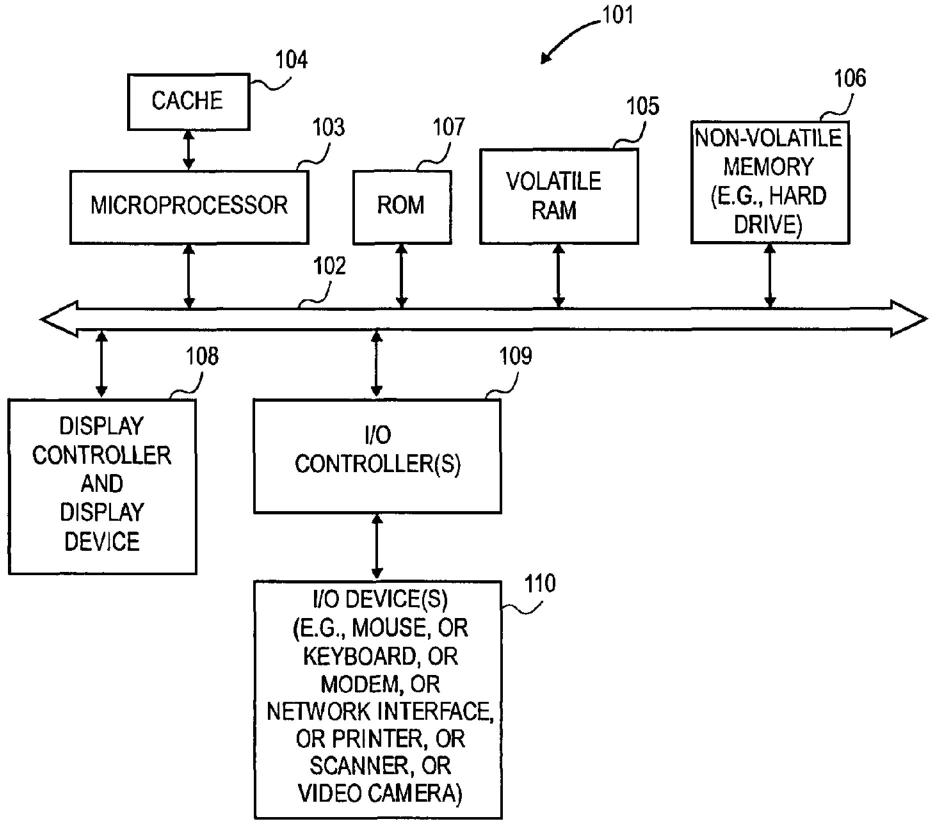
FIG. 2 shows an example of a data processing system with a display device in accordance with at least certain embodiments of the disclosures described herein.

FIG. 2 shows an example of a data processing system with a display device in accordance with at least certain embodiments of the disclosures described herein. FIG. 2 shows one example of a typical computer system which may be used with the present disclosure. Note that while FIG. 2 illustrates various components of a computer system, it is not intended to represent any particular architecture or manner of interconnecting the components as such details are not germane to the present disclosure. It will also be appreciated that personal digital assistants (PDAs), handheld computers, cellular telephones, media players (e.g., an iPod), devices which combine aspects or functions of these devices (e.g., a media player combined with a PDS and a cellular telephone in one device), an embedded processing device within another device, network computers and other data processing systems which have fewer components or perhaps more components may also be used to implement one or more embodiments of the present disclosure. The computer system of FIG. 2 may, for example, be an Apple Macintosh computer.

As shown in FIG. 2, the computer system 101, which is a form of a data processing system, includes a bus 102 which is coupled to a microprocessor 103 and a ROM 107 and volatile RAM 105 and a non-volatile memory 106. The microprocessor 103, which may be, for example, a microprocessor from Intel or a G3 or G4 microprocessor from Motorola, Inc. or IBM is coupled to cache memory 104 as shown in the example of FIG. 2. The bus 102 interconnects these various components together and also interconnects these components 103, 107, 105, and 106 to a display controller and display device(s) 108, which may include display devices and corresponding frame buffers, and to peripheral devices such as input/output (I/O) devices which may be mice, keyboards, modems, network interfaces, printers, scanners, video cameras and other devices which are well known in the art. The display controller 108 may include one or more frame buffers which are used to refresh multiple display devices or the frame buffers may be in a system RAM (e.g., RAM 105). Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 2 shows that the non-volatile memory is a local device coupled directly to the rest of the components in the data processing system, it will be appreciated that the present disclosure may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present disclosure may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present disclosure. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present disclosure seeks to describe a data processing system 101 that includes a microprocessor or processor 103 coupled to a bus 102. The data processing system 101 further includes a display or display device 108 coupled to the bus 102. A memory block such as ROM 107, RAM 105, or nonvolatile memory 106 is coupled to the bus 102 with the memory block being configured to store one or more programs and configured to store data for a two dimensional array of white points for presentation to the display 108. The processor 103 is configured to receive a selection of a target white point from the two dimensional array of white points to visually match a desired white color of a medium. For example, a user of the data processing system 101 may desire to match a white point of the display 108 to a white point of a medium. The user then selects the target white point from two dimensional array of white points in order to visually match the desired white color of the medium.

In one embodiment, the processor is configured to encode the selected target white point as two simultaneously captured variables. The processor is further configured to provide a first state of the display and then derive a second state of the display that corresponds to the target white point.

In another embodiment, the data processing system which is an electronic device includes a processor 103 coupled to a bus 102 and a display 108 coupled to the bus 102. The processor 103 is configured to provide a two dimensional array of white points for presentation to the display and to receive a selection of a marker of a white point from the two dimensional array of white points to visually match a desired white color of a medium. The processor 103 is further configured to set a native white point for the display. The processor 103 is further configured to convert coordinates of the two dimensional array into chromaticity coordinates of a chromaticity diagram. The processor 103 is further configured to convert the chromaticity coordinates into red, green, and blue (RGB) values. The processor 103 is further configured to determine if a certain value of a luminance is desired for the display. The processor 103 is further configured to adjust the RGB values until at least one RGB value reaches the maximum values of the display if no certain value of the luminance is desired for the display.

Figure 3:
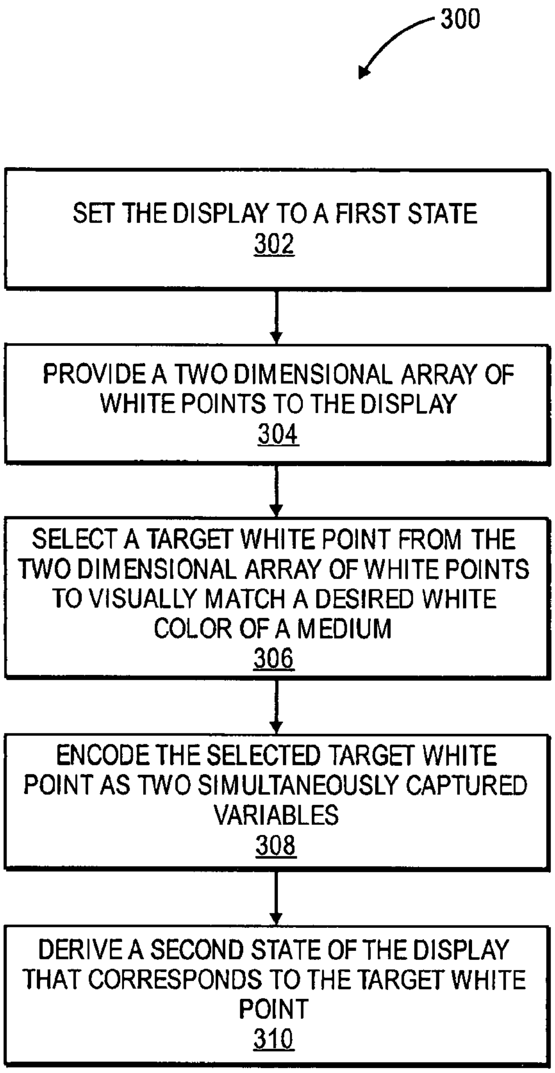
FIG. 3 is a flow chart of an embodiment of a method of the disclosures described herein.

FIG. 3 is a flow chart of an embodiment of a method of adjusting a target white point of a display for the disclosures described herein. The method 300 for adjusting the white point of the display includes setting the display to a first state at block 302. Setting the display to the first state may occur by encoding a display profile or by creating a set of parameters for the display. The method 300 further includes providing a two dimensional array of white points to the display at block 304. The method 300 further includes selecting a target white point from the two dimensional array of white points to visually match a desired white color of a medium at block 306. The method 300 further includes encoding the selected target white point as two simultaneously captured variables at block 308. The method 300 further includes deriving a second state of the display that corresponds to the target white point at block 310.

In at least certain embodiments, providing the two dimensional array of white points to the display is based on a portion of the first state. For example, the two dimensional array of white points may further include relative white point values in a predetermined array in a form of an image of different shades of white points that are relative to white point values of the portion of the first state. In this example, the white point array contains white points of different hues, like a color picker, allowing a relative selection of the white points. The selection of the white point may occur based on desiring a more reddish or more pinkish than current white point in order to match the desired white point. For this example, the complete first state of the display is not required. Only the partial state of the display that determines the code of the white points of the display is required.

In some embodiments, providing the two dimensional array of white points to the display is dynamically generated based on the first state. For example, the two dimensional array of white points may further include absolute white point values based on the first state. A point marked as D50 in the array corresponds to exactly the D50 standard. In this example, the first state of the display at block 302 is critical for building the white point array.

In one embodiment, providing the two dimensional array of white points to the display is based on a predetermined image that is dynamically altered dependent on the first state of the display.

In another embodiment, deriving the second state of the display that corresponds to the target white point is based on the two captured variables of the target white point and at least a portion of the first state. For example, the white point array may contain white points of different hues allowing a relative selection of the white points. Deriving the second state of the display depends only on a portion of the first state that determines the code of the white points of the display.

In an embodiment, the method 300 may further include deriving an optimum gray tracking of the display based on deriving the second state of the display that corresponds to the target white point of the display. Gray tracking indicates the degree of closeness of the chromaticity of grays generated from various levels of equal red, green, and blue input signals to the chromaticity of a target, for example the white point of the display.

In some embodiments, the method 300 may further include converting the two variables into chromaticity coordinates such as CIE xy, CIE Lu'v', or CIE La*b* that will be discussed in FIGS. 4-7.

Figure 4A:
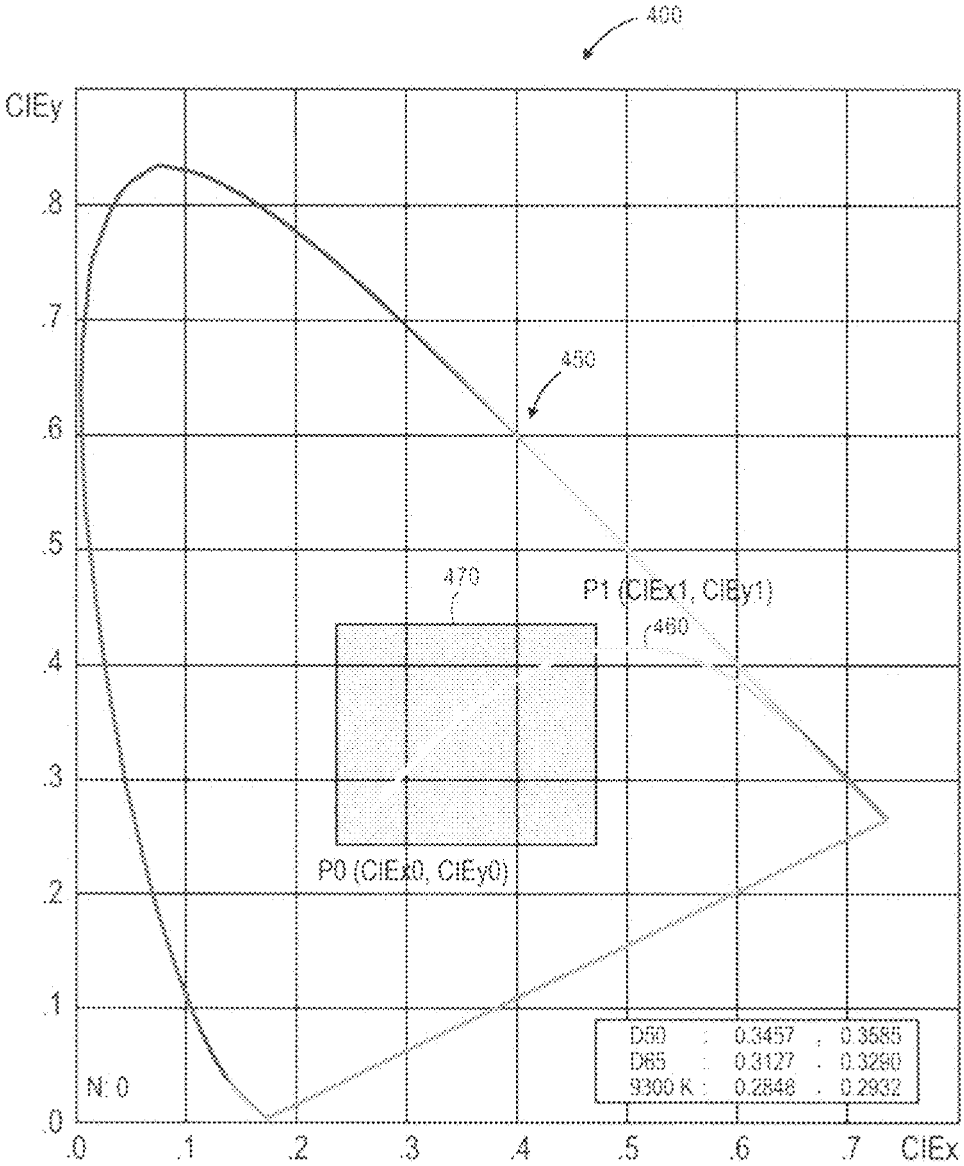
FIG. 4A shows a CIE 1931 chromaticity diagram that is transformed to provide a two dimensional array of white points in accordance with one embodiment of the disclosures described herein.

FIG. 4A shows a CIE 1931 chromaticity diagram that is transformed to provide a two dimensional array of white points in accordance with one embodiment of the disclosures described herein. The chromaticity diagram 400 includes x and y chromaticity coordinates derived from the tristimulus values X, Y, and Z, a color gamut 450, a black body locus or white point locus 460, and a transformation region 470 that corresponds to a two dimensional array of white points 402 in FIG. 4B which shows a display providing a view of the two dimensional array of white points 402 with an adjustable target white point in accordance with one embodiment of the disclosures described herein. The display may provide the view based on a display calibration program.

Chromaticity coordinates CIEx and CIEy are transformed to X and Y coordinates of the white point array 402 according to the following equations:

$$\text{draw}X=W^*(CIEx-CIEx0)/(CIEx1-CIEx0) \quad (1)$$

$$\text{draw}Y=H^*(CIEy-CIEy0)/(CIEy1-CIEy0) \quad (2)$$

Figure 4B:
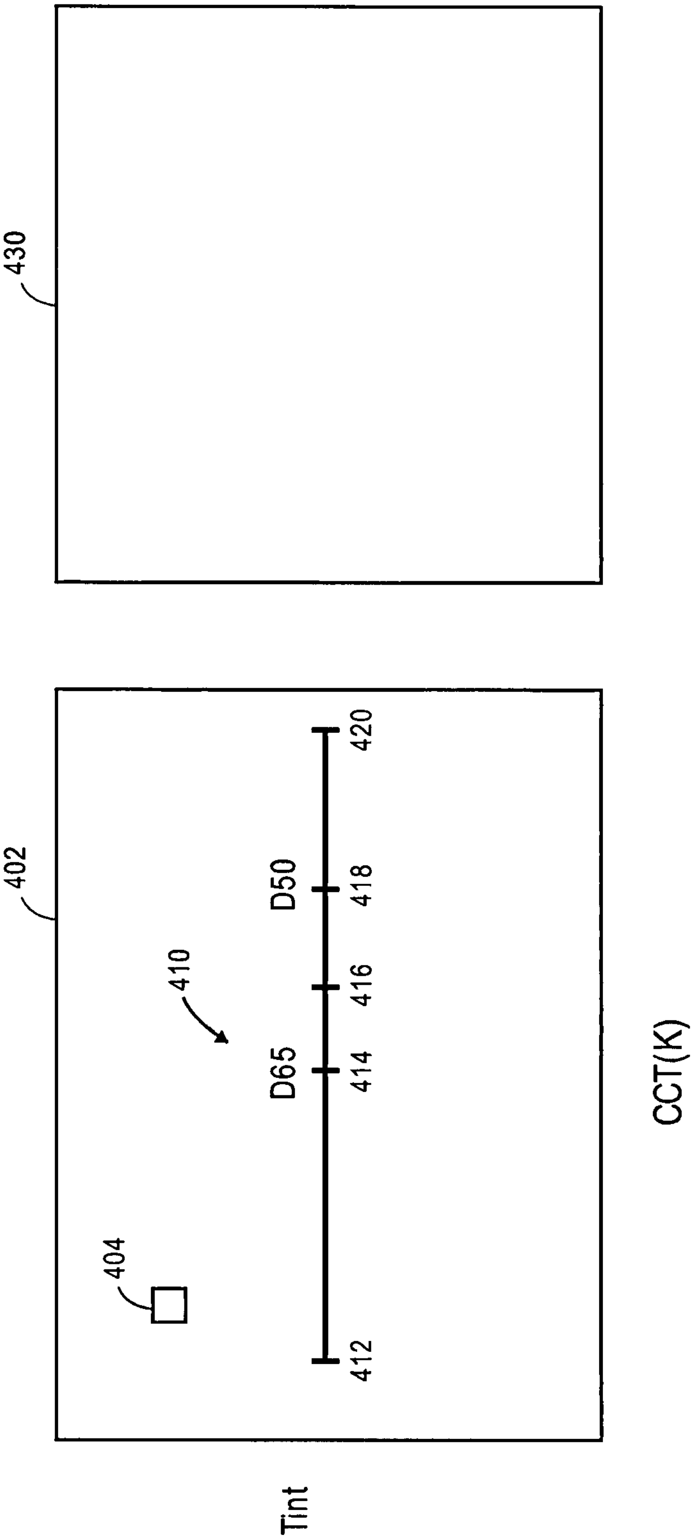
FIG. 4B shows a display providing a view of the two dimensional array of white points in accordance with one embodiment of the disclosures described herein.

The X and Y coordinates may be presented to the display or represented as tint (vertical axis) and correlated color temperature (horizontal axis) parameters as shown in FIG. 4B. The two dimensional array of white points 402 includes a marker 404 and an optional correlated color temperature (CCT) slider 410 with a slider bar 416. The slider 410 includes various correlated color temperatures such as 412, 414, 418, and 420. In one embodiment, 412, 414, 418, and 420 correspond to 9300K, standard D65, standard D50, and 4500K, respectively. The slider 410 may not be necessary. However, the slider 410 can be updated dynamically and thus serve as a scale for the two dimensional adjustment of the target white point to the equivalent temperature/tint numerical (slider) adjustments. A white patch area 430 displays the same white point selected by the marker 404.

In one embodiment, a user can select a desired white point setting for a display. Changing the white point adjusts the overall color tint of the display. Typically, a user will want to set the white point to the display's native white point or a standard white point such as D50 or D65.

In another embodiment, a temperature slider 410 and a tint slider are explicitly provided to the two dimensional array of white points 402. In a embodiment, the temperature slider 410 and the tint slider are not explicitly provided to the two dimensional array of white points 402. The dimensions of the array 402 in the form of a rectangle or other shape are temperature and tint though. The interior of the rectangle can be colored with the allowed target whites and the user can select by clicking or dragging in the rectangle. Thus, the user simultaneously adjusts the temperature and tint of the target white point of the display. The visualization within the rectangle or other shape of the target white colors may help the user to navigate quicker than with two explicit temperature and tint sliders adjusting sequentially toward the desired target white point.

In another example, the previous rectangle can be morphed into a circular sector region around the black body locus in the chromaticity diagram which allows two dimensional control of the selection of the target white point. Thus, a more experienced user such as a professional who is more familiar with the black body locus can navigate easier in a virtual chromaticity diagram toward the desired white point.

Figure 5:
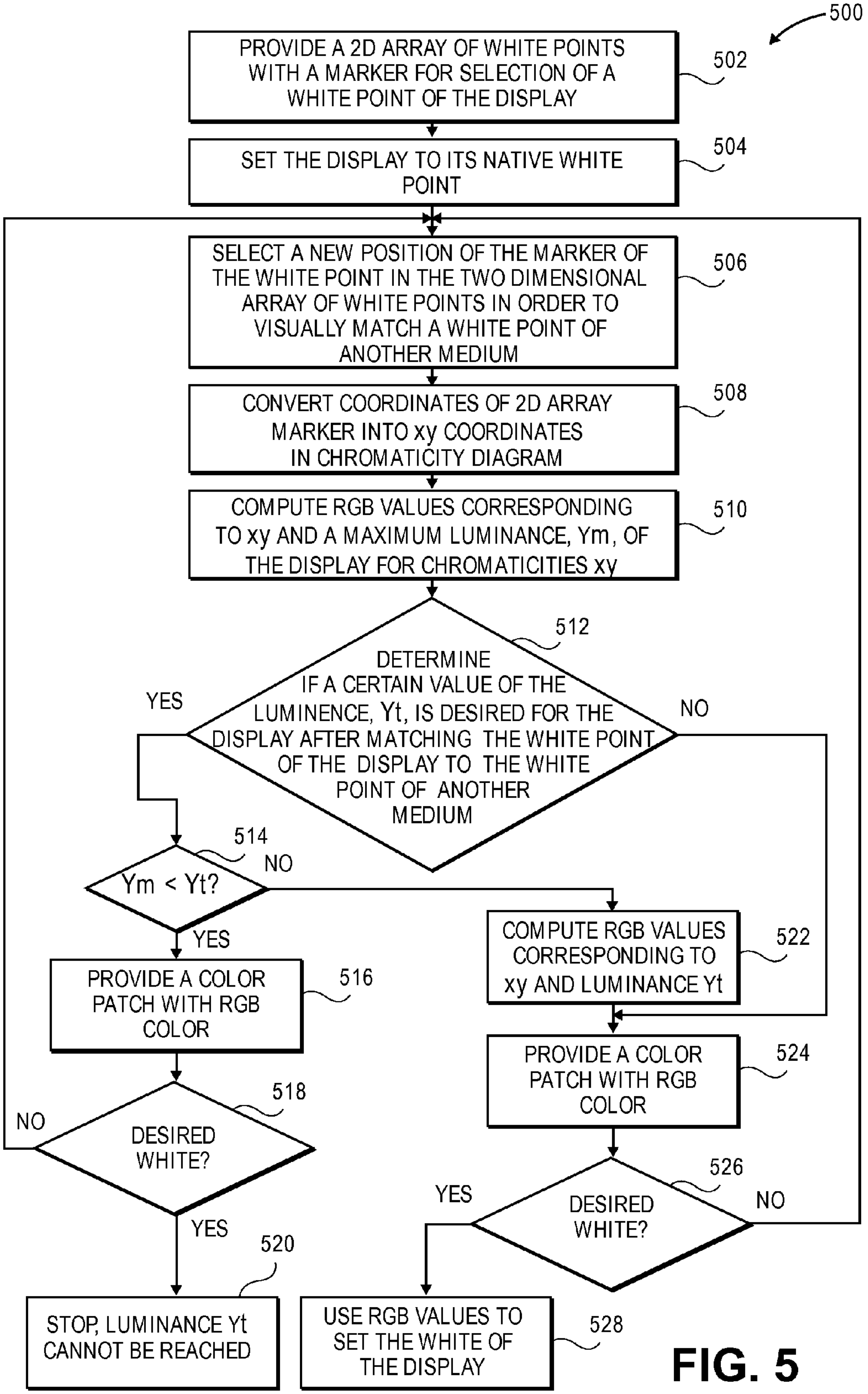
FIG. 5 is a flow chart of an embodiment of a method of setting a target white point of a display for the disclosures described herein.

FIG. 5 is a flow chart of an embodiment of a method of setting a target white point of a display for the disclosures described herein. The method 500 for setting the white point of the display includes providing a two dimensional array of white points to the display based on a current white point setting of the display at block 502. A marker, which may be in the form of various shapes, marks a position of a current white point on the two dimensional array. The method 500 further includes setting a native white point for the display at block 504. A prior approach would set the maximum values of the video card tables to [1,1,1] which represents a maximum intensity for the display. This ensures that the display native white point is set.

The method 500 further includes a user selecting a new position of the marker of the white point in the two dimensional array of white points in order to visually match a white point of another medium at block 506. The user makes the selection with an input device. In one embodiment, since the two dimensional array of white points 402 is part of the CIE chromaticity diagram 400 as discussed above, the placement of the white points in the two dimensional array 402 is familiar to those knowing the CIE 1931 chromaticity diagram 400.

The method 500 further includes converting coordinates of the two dimensional array into xy chromaticity coordinates of the chromaticity diagram at block 508 using the inverse of equations (1) and (2) discussed above. The method 500 further includes computing RGB values corresponding to xy and a maximum luminance, $Y_{max}$, of the display for chromaticities xy at block 510. For the Y value, which represents a measure of the brightness or luminance of a color, a fraction of the maximum value of Y may be used. For example, if the range of Y is [0,1], the value for Y is 0.3 for one embodiment.

In another embodiment, a color model is selected. For example, the color model may be a matrix based model (linear device). Then, Y is set to an arbitrary value (i.e., 1). Next, the coordinates xyY are converted to RGB (i.e., xyY to XYZ and XYZ to RGB). RGB values are then scaled up and/or down to R'G'B' until maximum values of R'G'B' equal maximum display device values. R'G'B' is then converted to X'Y'Z'. Y' is the maximum luminance $Y_{max}$ of the display for xy chromaticity coordinates.

In a different embodiment, a color model is selected. For example, the color model may be a three dimensional (3D) look up table (LUT) based model for an arbitrary display device. The 3D LUT device response values are measured. For RGB inputs, xyY outputs are measured for all combinations into a 3D LUT table. For Y having a range of $Y_{min}$ to $Y_{max}$ of the display device, xyY values are interpolated in the 3D LUT based model. The Y value for which at least one of the RGB values reaches a value larger than 1 is $Y_{max}$.

The method 500 further includes determining if a certain value of the luminance, $Y_t$, is desired for the display after matching the white point of the display to the white point of another medium at block 512. If the certain value of the luminance, $Y_t$, exceeds the $Y_{max}$ value at block 514, then a color patch is provided with RGB colors at block 516. At block 514, the luminance level can not be reached and only the white point can be adjusted with the color patch. If further adjustment of the desired white point is needed at block 518, the method 500 returns to block 506. If the user is satisfied with the white point at block 518, then the method 500 terminates at block 520 with the luminance $Y_t$ not being reached.

Returning to block 514, if $Y_t$ is less than $Y_{max}$, then the method 500 further includes computing RGB values corresponding to xy and luminance $Y_t$ at block 522. In one embodiment, a color model is selected. For example, the color model may be a matrix based model (linear device). Then, Y is set to the luminance $Y_t$ value. Next, the coordinates xyY are converted to RGB (i.e., xyY to XYZ and XYZ to RGB).

The method 500 further includes providing a color patch with RBG colors at block 524. The method 500 further includes determining whether the desired white point can be achieved from the color patch at block 526. If a user is satisfied with the white point, then the RGB values are used to set the white point of the display at block 528. Otherwise, if further adjustment of the desired white point is needed at block 526, the method 500 returns to the block 506.

Returning to block 512, if a certain luminance $Y_t$ is not desired, then the method 500 proceeds to block 524.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Figure 6A:
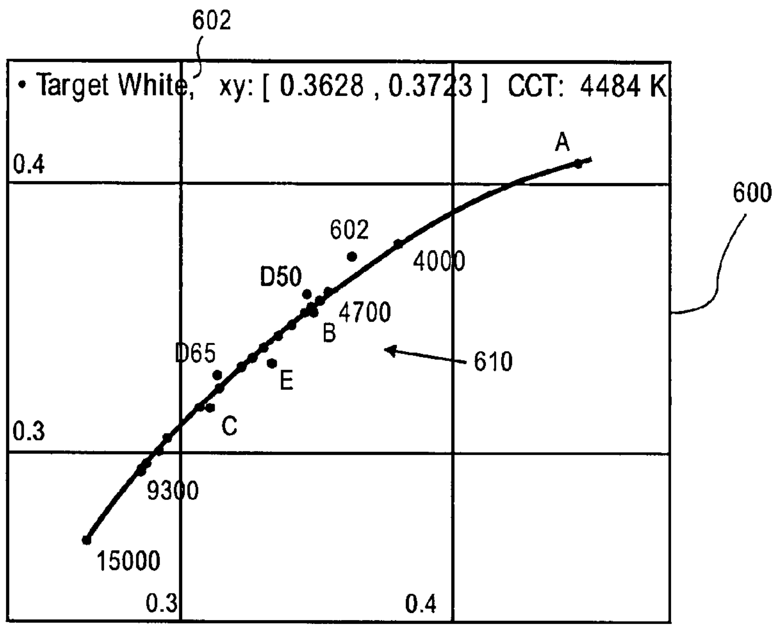
FIGS. 6A-6C show a display providing a view of a chromaticity diagram in accordance with some embodiments of the disclosures described herein.
Figure 6B:
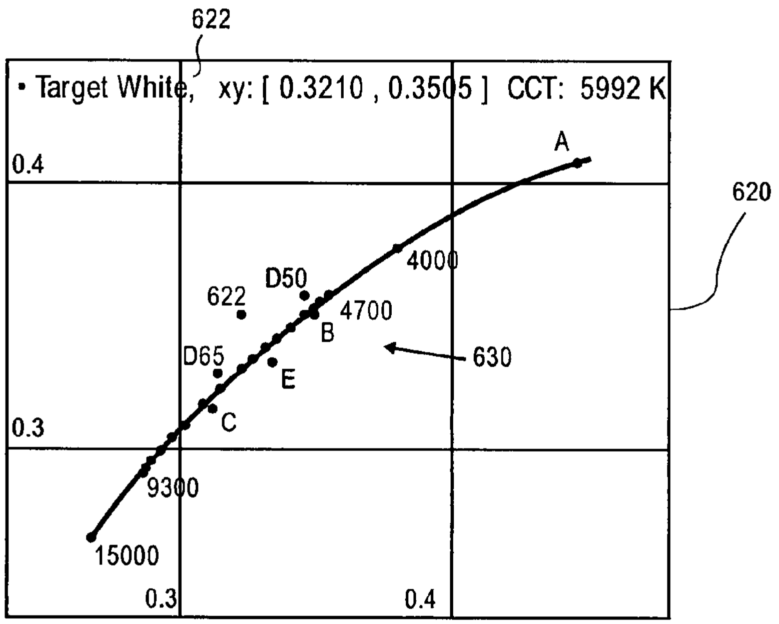
Figure 6C:
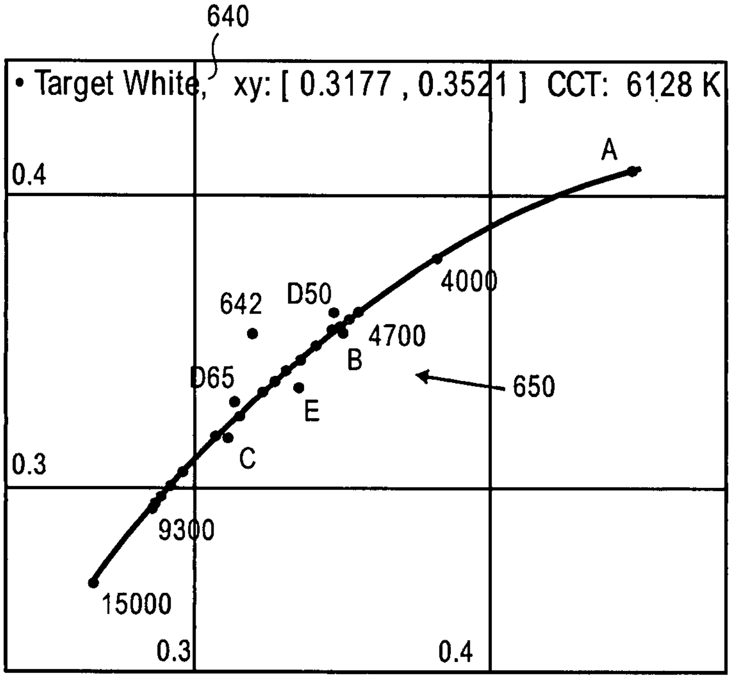

FIGS. 6A-6C show a display providing a view of a chromaticity diagram with an adjustable target white point in accordance with some embodiments of the disclosures described herein. FIG. 6A shows a chromaticity diagram 600 that is part of a CIE 1931 chromaticity diagram with xy derived coordinates. The diagram 600 includes a target white point 602 equal to xy:[0.3628, 0.3723] with a correlated color temperature of 4428K. Various correlated color temperatures points are labeled on or near a white point locus 610.

FIG. 6B shows a chromaticity diagram 620 that is part of a CIE 1931 chromaticity diagram with xy derived coordinates. The diagram 620 includes a target white point 622 equal to xy:[0.3210, 0.3505] with a correlated color temperature of 6992K. Various correlated color temperatures points are labeled on or near a white point locus 630.

FIG. 6C shows a chromaticity diagram 640 that is part of a CIE 1931 chromaticity diagram with xy derived coordinates. The diagram 640 includes a target white point 642 equal to xy:[0.3177, 0.3521] with a correlated color temperature of 6128K. Various correlated color temperatures points are labeled on or near a white point locus 650.

Figure 6D:
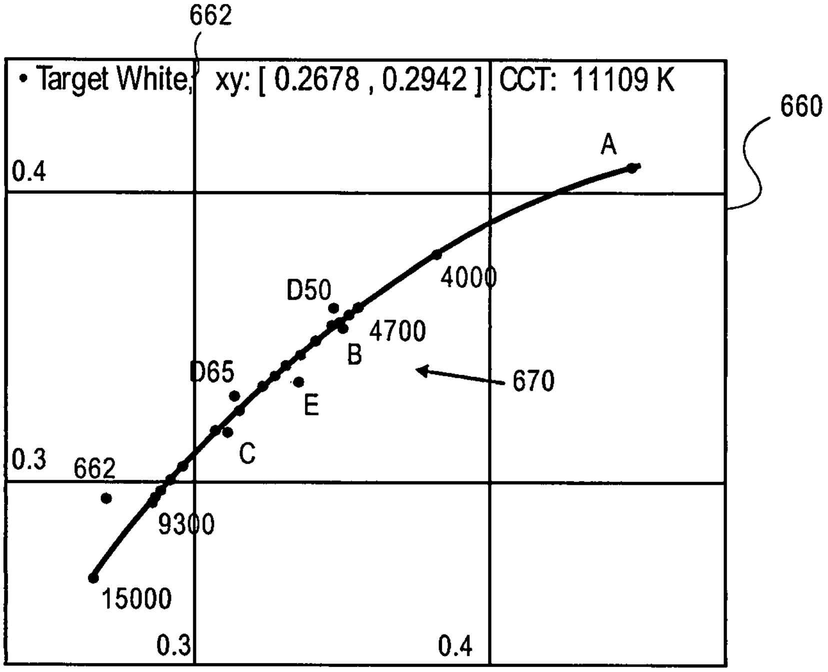
FIG. 6D shows a chromaticity diagram that is part of a CIE chromaticity diagram with xy derived coordinates.

FIG. 6D shows a chromaticity diagram 660 that is part of a CIE 1931 chromaticity diagram with xy derived coordinates. The diagram 660 includes a target white point 662 equal to xy:[0.2678, 0.2942] with a correlated color temperature of 11109K. Various correlated color temperatures points are labeled on or near a white point locus 670.

It should be appreciated that the systems and methods of the present disclosure can be implemented in other color spaces that have a reversible transformation between and to xyY space such as the CIELAB (CIE 1976 L*a*b* color space) and CIELUV color spaces.

The systems and methods of the present disclosure enable numerous advantages for adjusting a white point of a display compared to prior approaches. For example, the two dimensional array of white points provided to a display enables selection of a white point that is not located on the black body locus or white point locus. The target white points 602, 622, 642, and 662 are not located on their respective white body locus curves. A prior approach would not be able to select such a target white point.

Situations in which white point(s) are not necessarily on the black body locus include a daylight locus, a constant distance to a white point or to a black body locus (constant tint), various constraints on a white point that are not related to the black body locus or the daylight locus, a constant x, a constant y, a line between two illuminants (e.g., a mixture of colors), and at a smaller color distance than a certain threshold to another illuminant. Other situations with white points not being located on the black body locus include a white point beyond the black body locus such as a higher temperature than infinite and any xy coordinate that is convenient to the user. Also, standards such as D50 and D65 and points B, C, and E are not located on the black body locus.

The systems and methods described improve a visual display calibrator by allowing a user to select a target white point based on visual matching in addition to the adjustments provided by a correlated color temperature slider. The new adjustment allows two degrees of freedom and produces a better user experience when selecting the target white point of the display to match a white point of another medium.

Using the methods describe herein, the white point of the display results in a closer match to the target white point or intended white point of a particular media. The user experiences a better and more predictable behavior of the calibration process and of the color performance of the display. The final adjustment of the target white point of the display is more flexible and precise. Overall, the user experience with the display calibrator is improved.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for adjusting a white point of a display, the method comprising:

setting the display to a first state including a white point setting of the display;

providing a two dimensional array of white points to the display based on a subset of a chromaticity diagram having chromaticity coordinates associated with a CIE color space; and selecting a target white point from any white point of the two dimensional array of white points for two dimensional control of the white point to visually match the white point of the display to a desired white point of another medium, wherein the two dimensional array of white points includes dimensions of tint and correlated color temperature.

2. The method of claim 1, further comprising:

encoding the selected target white point as two simultaneously captured variables; and deriving a second state of the display that corresponds to the target white point.

3. The method of claim 2, wherein deriving the second state of the display that corresponds to the target white point is based on the two captured variables of the target white point and at least a portion of the first state.

4. The method of claim 1, wherein providing the two dimensional array of white points to the display is based on a portion of the first state, wherein the two dimensional array of white points includes a tint slider for adjusting tint and a correlated color temperature slider for adjusting the correlated color temperature to visually match the white point of the display to the desired white point of another medium.

5. The method of claim 4, wherein the two dimensional array of white points further comprises relative white point values in a predetermined array in a form of an image of different shades of white points that are relative to white point values of the portion of the first state.

6. The method of claim 1, wherein providing the two dimensional array of white points to the display is dynamically generated based on the first state, wherein the desired white point of another medium is a desired white point of another display.

7. The method of claim 6, wherein the two dimensional array of white points further comprises absolute white point values.

8. The method of claim 1, wherein providing the two dimensional array of white points to the display is based on a predetermined image that is dynamically altered dependent on the first state.

9. The method of claim 2, further comprising converting the two variables into chromaticity coordinates.

10. The method of claim 1, further comprising deriving an optimum gray tracking of the display based on deriving a second state of the display that corresponds to the target white point of the display.

11. A non-transitory machine readable medium storing executable program instructions which when executed cause a data processing system to perform a method comprising:

setting a display to a first state including a white point setting of the display;

providing a two dimensional array of white points to the display based on a subset of a chromaticity diagram having chromaticity coordinates associated with a CIE color space; and selecting a target white point from any white point of the two dimensional array of white points for two dimensional control of the white point to visually match a white point of the display to a desired white point of another medium, wherein the two dimensional array of white points includes dimensions of tint and correlated color temperature.

12. The non-transitory machine readable medium of claim 11, further comprising:

encoding the selected target white point as two simultaneously captured variables; and deriving a second state of the display that corresponds to the target white point.

13. The non-transitory machine readable medium of claim 12, wherein deriving the second state of the display that corresponds to the target white point is based on the two captured variables of the target white point and at least a portion of the first state.

14. The non-transitory machine readable medium of claim 11, wherein providing the two dimensional array of white points to the display is based on a portion of the first state, wherein the two dimensional array of white points includes a tint slider for adjusting tint and a correlated color temperature slider for adjusting the correlated color temperature to visually match the white point of the display to the desired white point of another medium.

15. The non-transitory machine readable medium of claim 14, wherein the two dimensional array of white points further comprises relative white point values in a predetermined array in a form of an image of different shades of white points that are relative to white point values of the portion of the first state.

16. The non-transitory machine readable medium of claim 11, wherein providing the two dimensional array of white points to the display is dynamically generated based on the first state, wherein the desired white point of another medium is a desired white point of another display.

17. The non-transitory machine readable medium of claim 16, wherein the two dimensional array of white points further comprises absolute white point values.

18. The non-transitory machine readable medium of claim 11, wherein providing the two dimensional array of white points to the display is based on a predetermined image that is dynamically altered dependent on the first state.

19. The non-transitory machine readable medium of claim 11, further comprising converting the two variables into chromaticity coordinates.

20. The non-transitory machine readable medium of claim 11, further comprising deriving an optimum gray tracking of the display based on deriving a second state of the display that corresponds to the target white point of the display.

21. An apparatus, comprising:

means for setting the display to a first state including a white point setting of the display;

means for providing a two dimensional array of white points to the display based on a subset of a chromaticity diagram having chromaticity coordinates associated with a CIE color space; and means for selecting a target white point from any white point of the two dimensional array of white points for two dimensional control of the white point to visually match the white point of the display to a desired white point of another medium, wherein the two dimensional array of white points includes dimensions of tint and correlated color temperature, wherein providing the two dimensional array of white points to the display is based on a predetermined image that is dynamically altered dependent on the first state.

22. A data processing system, comprising:

a processor coupled to a bus;

a display coupled to the bus having a first state including a white point setting;

a memory coupled to the bus with the memory configured to store one or more programs and configured to store data for a two dimensional array of white points for presentation to the display with the two dimensional array of white points being based on a subset of a chromaticity diagram having chromaticity coordinates associated with a CIE color space; and wherein the processor is configured to receive a selection of a target white point from any white point of the two dimensional array of white points for two dimensional control of the white point to visually match a white point of the display to a desired white point of another medium.

23. The data processing system of claim 22, wherein the processor is configured to encode the selected target white point as two simultaneously captured variables; and the processor is configured to derive a second state of the display that corresponds to the target white point.

24. The data processing system of claim 23, wherein the second state of the display that corresponds to the target white point is based on the two captured variables of the target white point and at least a portion of the first state of settings for the display.

25. The data processing system of claim 22, wherein the two dimensional array of white points to the display is based on at least a portion of the first state, wherein providing the two dimensional array of white points to the display is based on a predetermined image that is dynamically altered dependent on the first state of the display having a white point setting.

26. The data processing system of claim 23, wherein the two variables are converted into chromaticity coordinates.

27. The data processing system of claim 22, wherein the processor is configured to desire an optimum gray tracking of the display based on a second state of the display that corresponds to the target white point of the display.

28. A method for setting a white point color of a display, the method comprising:

providing a two dimensional array of white points to the display based on a current white point setting of the display;

setting a native white point for the display;

selecting a new position of a marker of the white point in the two dimensional array of white points in order to visually match a white point of another medium, wherein the two dimensional array of white points includes dimensions of tint and correlated color temperature, wherein the two dimensional array of white points is based on a subset of a chromaticity diagram having chromaticity coordinates associated with a CIE color space;

determining if a certain value of a luminance is desired for the display after matching the white point of the display to the white point of another medium;

determining if the desired certain value of the luminance exceeds a maximum value of the luminance; and subsequently determining whether further adjustment of the white point is needed by providing a color patch based on red, green, and blue (RGB) values to the display when the desired certain value of the luminance exceeds the maximum value of the luminance.

29. The method of claim 28, further comprises converting coordinates of the two dimensional array into chromaticity coordinates of a chromaticity diagram.

30. The method of claim 29, further comprises converting the chromaticity coordinates into red, green, and blue (RGB) values.

31. The method of claim 28, further comprises adjusting the RGB values until at least one RGB value reaches the maximum values of the display if no certain value of the luminance is desired for the display.

32. The method of claim 28, further comprises updating the new position of the white point, wherein the white point of the display is visually matched to a white point of another display.

33. The method of claim 29, wherein the chromaticity coordinates are at least one of international commission on illumination (CIE) xy coordinates, CIE Lu'v' coordinates, and CIE Lab coordinates.

34. A non-transitory machine readable medium storing executable program instructions which when executed cause a data processing system to perform a method comprising:

providing a two dimensional array of white points to the display based on a current white point setting of the display;

setting a native white point for the display;

selecting a new position of a marker of the white point in the two dimensional array of white points in order to visually match a white point of another medium, wherein the two dimensional array of white points includes dimensions of tint and correlated color temperature, wherein the two dimensional array of white points is based on a subset of a chromaticity diagram having chromaticity coordinates associated with a CIE color space;

determining if a certain value of a luminance is desired for the display after matching the white point of the display to the white point of another medium;

determining if the desired certain value of the luminance exceeds a maximum value of the luminance; and subsequently determining whether further adjustment of the white point is needed by providing a color patch based on red, green, and blue (RGB) values to the display when the desired certain value of the luminance exceeds the maximum value of the luminance.

35. The non-transitory machine readable medium of claim 34, further comprises converting coordinates of the two dimensional array into chromaticity coordinates of a chromaticity diagram.

36. The non-transitory machine readable medium of claim 35, further comprises converting the chromaticity coordinates into red, green, and blue (RGB) values.

37. The non-transitory machine readable medium of claim 34, further comprises adjusting the RGB values until at least one RGB value reaches the maximum values of the display if no certain value of the luminance is desired for the display.

38. The non-transitory machine readable medium of claim 34, further comprises updating the new position of the white point.

39. The non-transitory machine readable medium of claim 35, wherein the chromaticity coordinates are at least one of international commission on illumination (CIE) xy coordinates, CIE Lu'v' coordinates, and CIE Lab coordinates.

40. An apparatus, comprising:

means for providing a two dimensional array of white points to the display based on a current white point setting of the display;

means for setting a native white point for the display;

means for selecting a new position of a marker of the white point in the two dimensional array of white points in order to visually match a white point of another medium, wherein the two dimensional array of white points include dimensions of tint and correlated color temperature, wherein the two dimensional array of white points is based on a subset of a chromaticity diagram having chromaticity coordinates associated with a CIE color space;

means for determining if a certain value of a luminance is desired for the display after matching the white point of the display to the white point of another medium;

means for determining if the desired certain value of the luminance exceeds a maximum value of the luminance; and means for subsequently determining whether further adjustment of the white point is needed by providing a color patch based on red, green, and blue (RGB) values to the display when the desired certain value of the luminance exceeds the maximum value of the luminance.

41. The apparatus of claim 40, further comprises means for converting coordinates of the two dimensional array into chromaticity coordinates of a chromaticity diagram.

42. A device, comprising:

a processor coupled to a bus; and a display coupled to the bus; and wherein the processor is configured to provide a two dimensional array of white points for presentation to the display and to receive a selection of a marker of a white point from the two dimensional array of white points to visually match a desired white color of a medium, wherein the two dimensional array of white points includes dimensions of tint and correlated color temperature, wherein the two dimensional array of white points is based on a subset of a chromaticity diagram having chromaticity coordinates associated with a CIE color space that provides a color space for matching the white point of the display to the white point of another medium; wherein the processor is further configured to determine if a certain value of a luminance is desired for the display after matching the white point of the display to the white point of another medium, to determine if the desired certain value of the luminance exceeds a maximum value of the luminance, and to subsequently determine whether further adjustment of the white point is needed by providing a color patch based on red, green, and blue (RGB)

values to the display when the desired certain value of the luminance exceeds the maximum value of the luminance.

43. The device of claim 42, wherein the processor is further configured to set a native white point for the display.

44. The device of claim 42, wherein the processor is further configured to convert coordinates of the two dimensional array into chromaticity coordinates of a chromaticity diagram.

45. The device of claim 44, wherein the processor is further configured to convert the chromaticity coordinates into red, green, and blue (RGB) values.

46. The device of claim 42, wherein the processor is further configured to adjust the RGB values until at least one RGB value reaches the maximum values of the display if no certain value of the luminance is desired for the display.

* * * * *